United States Patent
Al-Qutami et al.

(10) Patent No.: US 12,477,301 B2
(45) Date of Patent: Nov. 18, 2025

(54) MACHINE LEARNING LOCALIZATION METHODS AND SYSTEMS

(71) Applicant: Petroliam Nasional Berhad (PETRONAS), Kuala Lumpur (MY)

(72) Inventors: Tareq Aziz Hasan Al-Qutami, Kuala Lumpur (MY); Fatin Awina Awis, Kuala Lumpur (MY); Syed Redzal Hisham Syed A Hamid, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 421 days.

(21) Appl. No.: 18/009,964

(22) PCT Filed: Jun. 15, 2021

(86) PCT No.: PCT/MY2021/050046
§ 371 (c)(1),
(2) Date: Dec. 12, 2022

(87) PCT Pub. No.: WO2021/256917
PCT Pub. Date: Dec. 23, 2021

(65) Prior Publication Data
US 2023/0232187 A1    Jul. 20, 2023

(30) Foreign Application Priority Data
Jun. 15, 2020   (MY) .............. 2020003055

(51) Int. Cl.
*H04W 4/029* (2018.01)
*H04W 4/33* (2018.01)

(52) U.S. Cl.
CPC ............ *H04W 4/029* (2018.02); *H04W 4/33* (2018.02)

(58) Field of Classification Search
None
See application file for complete search history.

(56) References Cited

U.S. PATENT DOCUMENTS

| | | |
|---|---|---|
| 2012/0150442 A1 | 6/2012 | Nishikawa |
| 2016/0021503 A1 | 1/2016 | Tapla |
| | (Continued) | |

FOREIGN PATENT DOCUMENTS

| | | |
|---|---|---|
| KR | 1020170021692 A | 2/2017 |

OTHER PUBLICATIONS

International Search Report and Written Opinion for Corresponding Application No. PCT/MY2021/050046 (mailed Oct. 26, 2021).

*Primary Examiner* — Frantz Bataille
(74) *Attorney, Agent, or Firm* — Troutman Pepper Locke LLP (Rochester)

(57) ABSTRACT

Machine learning method and systems for estimating a location of a target wireless device in an environment are disclosed. A machine learning method comprises: receiving a plurality of training received signal indictor data sets for discrete locations in the environment, each training received signal data set comprising received signal indicator values and corresponding wireless transmitter identifiers for wireless signals received by a test wireless device at a respective discrete location; generating feature vectors from the received signal indicator data sets; training a machine learning model using the feature vectors to obtain a trained machine learning model; receiving a target received signal data set from the target wireless device, the target received signal data set comprising signal indicator values and corresponding wireless transmitter identifiers for wireless signals received by the target wireless device; generating a target feature vector from the target received signal data set; and estimating a location of the target wireless device as a (Continued)

discrete location output by the trained machine learning model in response to the target feature vector.

20 Claims, 4 Drawing Sheets

(56) References Cited

U.S. PATENT DOCUMENTS

| | | |
|---|---|---|
| 2016/0110657 A1 | 4/2016 | Gibiansky et al. |
| 2016/0302035 A1 | 10/2016 | Kiskani et al. |
| 2021/0160812 A1* | 5/2021 | Manolakos ............ H04W 4/025 |
| 2021/0390854 A1* | 12/2021 | Sen ........................ G06N 3/045 |

* cited by examiner

MACHINE LEARNING LOCALIZATION METHODS AND SYSTEMS

This application is a national stage application under 35 U.S.C. § 371 of PCT Application No. PCT/MY2021/050046, filed Jun. 15, 2021, which claims the priority benefit of Malaysia Patent Application No. PI2020003055, filed Jun. 15, 2020, each of which is incorporated by reference herein in its entirety.

TECHNICAL FIELD

The present disclosure relates to machine learning localization methods and systems. In particular, the present disclosure relates to methods and systems for estimating the location of a wireless device in an environment based on the signals received by the wireless device.

BACKGROUND

In many environments, knowledge of the locations of personnel and assets is important information in a variety of scenarios, for example, emergency and search and rescue, contact tracking to enable tracing of possible spread of a virus pandemic such as COVID-19, efficiency and productivity monitoring by tracking a work crew location during a job, tracking time taken to complete a job, provision of remote support, and security related applications. In some environments, satellite geolocation systems such as the global positioning system (GPS) can be used. Such systems however, only work in environments where there is no obstruction to satellites and cannot be used in indoor environments.

To address the demand for location determination in indoor environments, there is a need for an indoor localization system. Many localization systems such as trilateration require experts collect reference measurements in order to set up and can be complex to roll out over large environments.

SUMMARY

According to a first aspect of the present disclosure a machine learning method for estimating a location of a target wireless device in an environment is provided. The method comprises: receiving a plurality of training received signal indictor data sets for discrete locations in the environment, each training received signal data set comprising received signal indicator values and corresponding wireless transmitter identifiers for wireless signals received by a test wireless device at a respective discrete location; generating feature vectors from the received signal indicator data sets; training a machine learning model using the feature vectors to obtain a trained machine learning model; receiving a target received signal data set from the target wireless device, the target received signal data set comprising signal indicator values and corresponding wireless transmitter identifiers for wireless signals received by the target wireless device; generating a target feature vector from the target received signal data set; and estimating a location of the target wireless device as a discrete location output by the trained machine learning model in response to the target feature vector.

In an embodiment, the method further comprises clustering the feature vectors into a plurality of clusters.

In an embodiment, the method further comprises training a machine learning model for each cluster of feature vectors and wherein estimating a location of the target wireless device comprises identifying a target cluster of the plurality of clusters for the target feature vector and estimating the location of the target wireless device as the discrete location output by the trained machine learning model corresponding to the target cluster in response to the target feature vector.

In an embodiment, the method further comprises training a plurality of machine learning models using the feature vectors to obtain a plurality of trained machine learning models and selecting one of the trained machine learning models as the machine learning model for estimating the location of the target wireless device.

In an embodiment, the method further comprises dividing the feature vectors into a training feature vector set and a test feature vector set, wherein training the plurality of machine learning models comprises training the plurality of machine learning models with training feature vector set and selecting one of the trained machine learning models comprises calculating an evaluation metric using the test data set and selecting one of the plurality of machine learning models based on the evaluation metric.

In an embodiment, the machine learning model is an ensemble algorithm.

In an embodiment, generating feature vectors from the received signal indicator data sets comprises transforming the signal indicator data sets into uniform size vectors by appending a value for wireless transmitter identifiers for which no signal was detected.

In an embodiment, generating feature vectors from the received signal indicator data sets comprises filtering the received signal data sets based on the wireless transmitter identifiers.

In an embodiment, generating feature vectors from the received signal indicator data sets comprises applying a filter to datasets corresponding to common wireless transmitter identifiers.

In an embodiment, the method further comprises displaying an indication of the location of the target wireless device on a plan of the environment.

According to a second aspect of the present disclosure, a contact tracing method is provided. The contact tracing method comprises performing a method described above for multiple wireless devices corresponding to different personnel members at a plurality of different times and identifying contacts of a target personnel member based on the times and estimated locations of the personnel members.

According to a third aspect of the present disclosure a computer readable medium storing processor executable instructions which when executed on a processor cause the processor to carry out a method as set out above is provided.

According to a fourth aspect of the present disclosure a machine learning system for estimating a location of a target wireless device in an environment is provided. The machine learning system comprises a processor and a data storage device storing computer program instructions operable to cause the processor to: receive a plurality of training received signal indictor data sets for discrete locations in the environment, each training received signal data set comprising received signal indicator values and corresponding wireless transmitter identifiers for wireless signals received by a test wireless device at a respective discrete location; generate feature vectors from the received signal indicator data sets; train a machine learning model using the feature vectors to obtain a trained machine learning model; receive a target received signal data set from the target wireless device, the target received signal data set comprising signal indicator values and corresponding wireless transmitter identifiers for wireless signals received by the target wireless device; generate a target feature vector from the target received signal data set; and estimate a location of the target wireless device as a discrete location output by the trained machine learning model in response to the target feature vector.

Further embodiments of the present invention are set out in the following clauses:

1. A machine learning method for estimating a location of a target wireless device in an environment, the method comprising:
    receiving a plurality of training received signal indictor data sets for discrete locations in the environment, each training received signal data set comprising received signal indicator values and corresponding wireless transmitter identifiers for wireless signals received by a test wireless device at a respective discrete location;
    generating feature vectors from the received signal indicator data sets;
    training a machine learning model using the feature vectors to obtain a trained machine learning model;
    receiving a target received signal data set from the target wireless device, the target received signal data set comprising signal indicator values and corresponding wireless transmitter identifiers for wireless signals received by the target wireless device;
    generating a target feature vector from the target received signal data set; and
    estimating a location of the target wireless device as a discrete location output by the trained machine learning model in response to the target feature vector.

2. A method according to clause 1, further comprising clustering the feature vectors into a plurality of clusters.

3. A method according to clause 2, further comprising training a machine learning model for each cluster of feature vectors and wherein estimating a location of the target wireless device comprises identifying a target cluster of the plurality of clusters for the target feature vector and estimating the location of the target wireless device as the discrete location output by the trained machine learning model corresponding to the target cluster in response to the target feature vector.

4. A method according to any preceding clause, further comprising training a plurality of machine learning models using the feature vectors to obtain a plurality of trained machine learning models and selecting one of the trained machine learning models as the machine learning model for estimating the location of the target wireless device.

5. A method according to clause 4, further comprising dividing the feature vectors into a training feature vector set and a test feature vector set, wherein training the plurality of machine learning models comprises training the plurality of machine learning models with training feature vector set and selecting once of the trained machine learning models comprises calculating an evaluation metric using the test data set and selecting one of the plurality of machine learning models based on the evaluation metric.

6. A method according to any one of the preceding clauses, wherein the machine learning model is an ensemble algorithm.

7. A method according to any one of the preceding clauses, wherein generating feature vectors from the received signal indicator data sets comprises transforming the signal indicator data sets into uniform size vectors by appending a value for wireless transmitter identifiers for which no signal was detected.

8. A method according to any one of the preceding clauses, wherein generating feature vectors from the received signal indicator data sets comprises filtering the received signal data sets based on the wireless transmitter identifiers.

9. A method according to any one of the preceding clauses, wherein generating feature vectors from the received signal indicator data sets comprises applying a filter to datasets corresponding to common wireless transmitter identifiers.

10. A method according to any one of the preceding clauses, further comprising displaying an indication of the location of the target wireless device on a plan of the environment.

11. A contact tracing method comprising performing a method according to one of the preceding clauses for multiple wireless devices corresponding to different personnel members at a plurality of different times and identifying contacts of a target personnel member based on the times and estimated locations of the personnel members.

12. A computer readable medium storing processor executable instructions which when executed on a processor cause the processor to carry out a method according to any one of clauses 1 to 11.

13. A machine learning system for estimating a location of a target wireless device in an environment, the machine learning system comprising a processor and a data storage device storing computer program instructions operable to cause the processor to:
    receive a plurality of training received signal indictor data sets for discrete locations in the environment, each training received signal data set comprising received signal indicator values and corresponding wireless transmitter identifiers for wireless signals received by a test wireless device at a respective discrete location;
    generate feature vectors from the received signal indicator data sets;
    train a machine learning model using the feature vectors to obtain a trained machine learning model;
    receive a target received signal data set from the target wireless device, the target received signal data set comprising signal indicator values and corresponding wireless transmitter identifiers for wireless signals received by the target wireless device;
    generate a target feature vector from the target received signal data set; and
    estimate a location of the target wireless device as a discrete location output by the trained machine learning model in response to the target feature vector.

14. A machine learning system according to clause 13, wherein the data storage device further stores computer program instructions operable to cause the processor to: cluster the feature vectors into a plurality of clusters.

15. A machine learning system according to clause 13, wherein the data storage device further stores computer program instructions operable to cause the processor to: train a machine learning model for each cluster of feature vectors and to estimate a location of the target wireless device by identifying a target cluster of the plurality of clusters for the target feature vector and estimating the location of the target wireless device as the discrete location output by the trained machine learning model corresponding to the target cluster in response to the target feature vector.

16. A machine learning system according to any one of clauses 13 to 15, wherein the data storage device further stores computer program instructions operable to cause the processor to: train a plurality of machine learning models using the feature vectors to obtain a plurality of trained machine learning models and select one of the trained machine learning models as the machine learning model for estimating the location of the target wireless device.

17. A machine learning system according to any one of clauses 13 to 16, wherein the data storage device further stores computer program instructions operable to cause the processor to: generate feature vectors from the received signal indicator data sets by transforming the signal indicator data sets into uniform size vectors by appending a value for wireless transmitter identifiers for which no signal was detected.

18. A machine learning system according to any one of clauses 13 to 17, wherein the data storage device further stores computer program instructions operable to cause the processor to: generate feature vectors from the received signal indicator data sets by transforming the signal indicator data sets into uniform size vectors by filtering the received signal data sets based on the wireless transmitter identifiers.

19. A machine learning system according to any one of clauses 13 to 18, wherein the data storage device further stores computer program instructions operable to cause the processor to: display an indication of the location of the target wireless device on a plan of the environment.

20. A machine learning system according to any one of clauses 13 to 19, wherein the data storage device further stores computer program instructions operable to cause the processor to: estimate the position of multiple wireless devices corresponding to different personnel members at a plurality of different times and identify contacts of a target personnel member based on the times and estimated locations of the personnel members.

BRIEF DESCRIPTION OF THE DRAWINGS

In the following, embodiments of the present invention will be described as non-limiting examples with reference to the accompanying drawings in which.

DETAILED DESCRIPTION

The present disclosure relates to the localization of personnel in an environment by estimating the location of an electronic device such as a mobile telephone using received signal indicators for a wireless communication system such as Wi-Fi (IEEE 802.11) or Bluetooth. Alternatively, the received signal indicators may be other indicators such as Signal Time Of Arrival or Signal Time Of Flight which many wireless interfaces can provide. In the following detailed examples, RSSI broadcast by wireless access points are used, however, it will be appreciated that the RSSIs could be replaced by other indicators.

Figure 1:
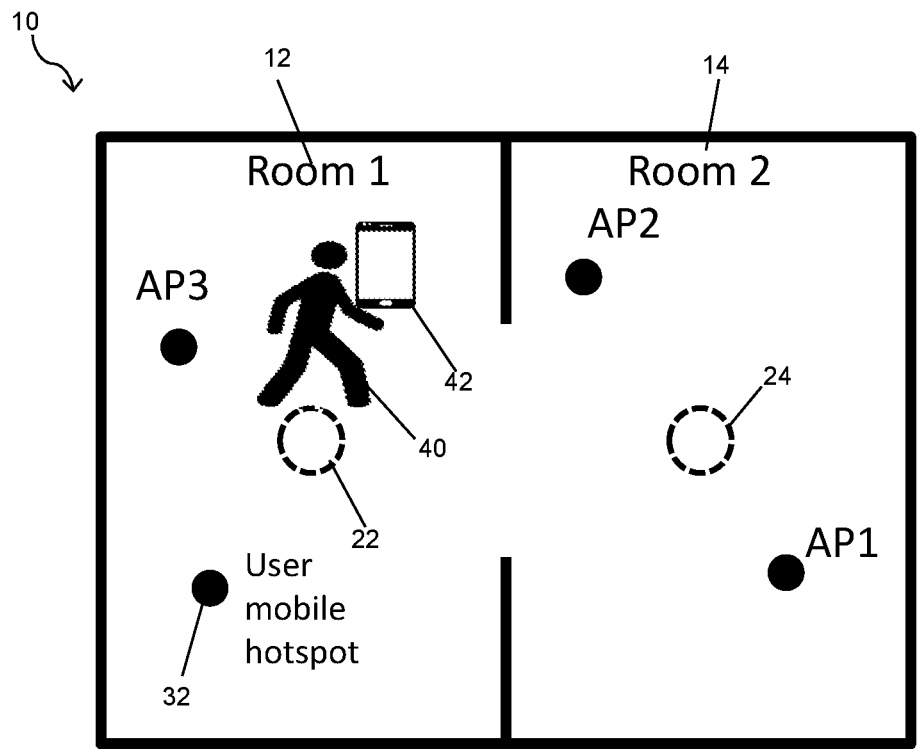
FIG. 1 shows a plan view of an environment in which locations are estimated in embodiments of the present invention.

FIG. 1 shows a plan view of an environment in which locations are estimated in embodiments of the present invention. In this example, the environment 10 is an indoor environment comprising two rooms: a first room 12 and a second room 14. A first discrete location 22 is defined within the first room 12 and a second discrete location 24 is defined within the second room 14. A shown in FIG. 1, the environment has several wireless access points, in this example, the wireless access points are Wi-Fi access points. A first wireless access point AP1 and a second wireless access point AP2 are located in the second room 14. A third wireless access point AP3 and a user mobile hotspot 32 are located in the first room 12. As will be described in more detail below, since the user mobile hotspot 32 is not a fixed device, in some embodiments it is not included in the location estimation process since its location may change. A user 40 has a client device 42 in their possession and the present disclosure relates to using the received signal strength indicators for signals from the wireless access points to estimate the location of the user 40 as one of the discrete locations.

It should be noted that while the example shown in FIG. 1 shows two discrete locations and two rooms, this scenario is described for simplicity and it is envisaged that embodiments of the present invention may be applied to more complex environments, for example environments having a larger number of rooms and multiple discrete locations within each of the rooms. Further, the environment may include multiple floors or levels and embodiments of the invention may be used to localize personnel to one of the levels and to a room or location within the level.

Figure 2:
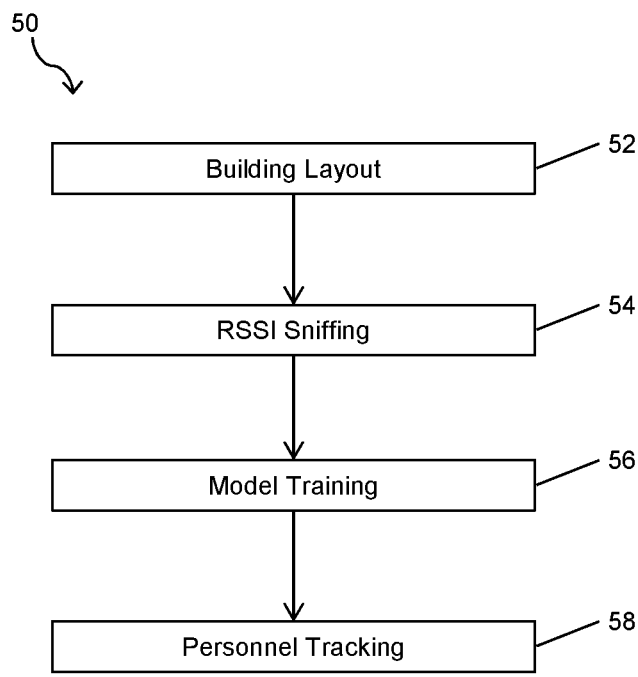
FIG. 2 is a flow chart showing a workflow for personnel tracking according to an embodiment of the present invention.

FIG. 2 is a flow chart showing a workflow for personnel tracking according to an embodiment of the present invention. As shown in FIG. 2, the workflow 50 comprises obtaining a building layout 52 which shows the environment in which personnel are to be tracked. Once this building layout has been obtained, zones and discrete locations corresponding to the zones are defined. Then received signal strength indicator (RSSI) sniffing 54 is carried out, RSSI sniffing may also be referred to as RSSI fingerprinting. The process for RSSI sniffing comprises a user taking a user device to each of the discrete locations and obtaining RSSI data sets for each of the discrete locations. Multiple data sets may be obtained for each discrete location, for example by the user holding the user device in different orientations for different data sets. In step 56 model training is carried out. Features are extracted from the RSSI data sets and feature vectors are formed which are used to train a machine learning model. Then, personnel tracking 58 is carried out using the trained model. It is envisaged that users, for example personnel working in an environment such as a factory or an oil rig will install a localization application on their mobile device. This localization application will periodically determine RSSI data for wireless access points in the vicinity and send the RSSI data to a server or cloud based system which will use the trained model to estimate the location of the user from the plurality of discrete locations using the RSSI data. The system may provide a dashboard to a manager, which shows the current locations of all personnel under their management. In some embodiments, the locations of personnel may be stored with time stamps. Such a system may be used for contact tracing if a personnel member is found to have contracted a contagious disease.

Since the locations and times when the user was present at those locations can be determined from the stored data, other members of personnel who came into close contact with the personnel member can be identified from the tracking data and those personnel can be isolated and tested for the disease.

Figure 3:
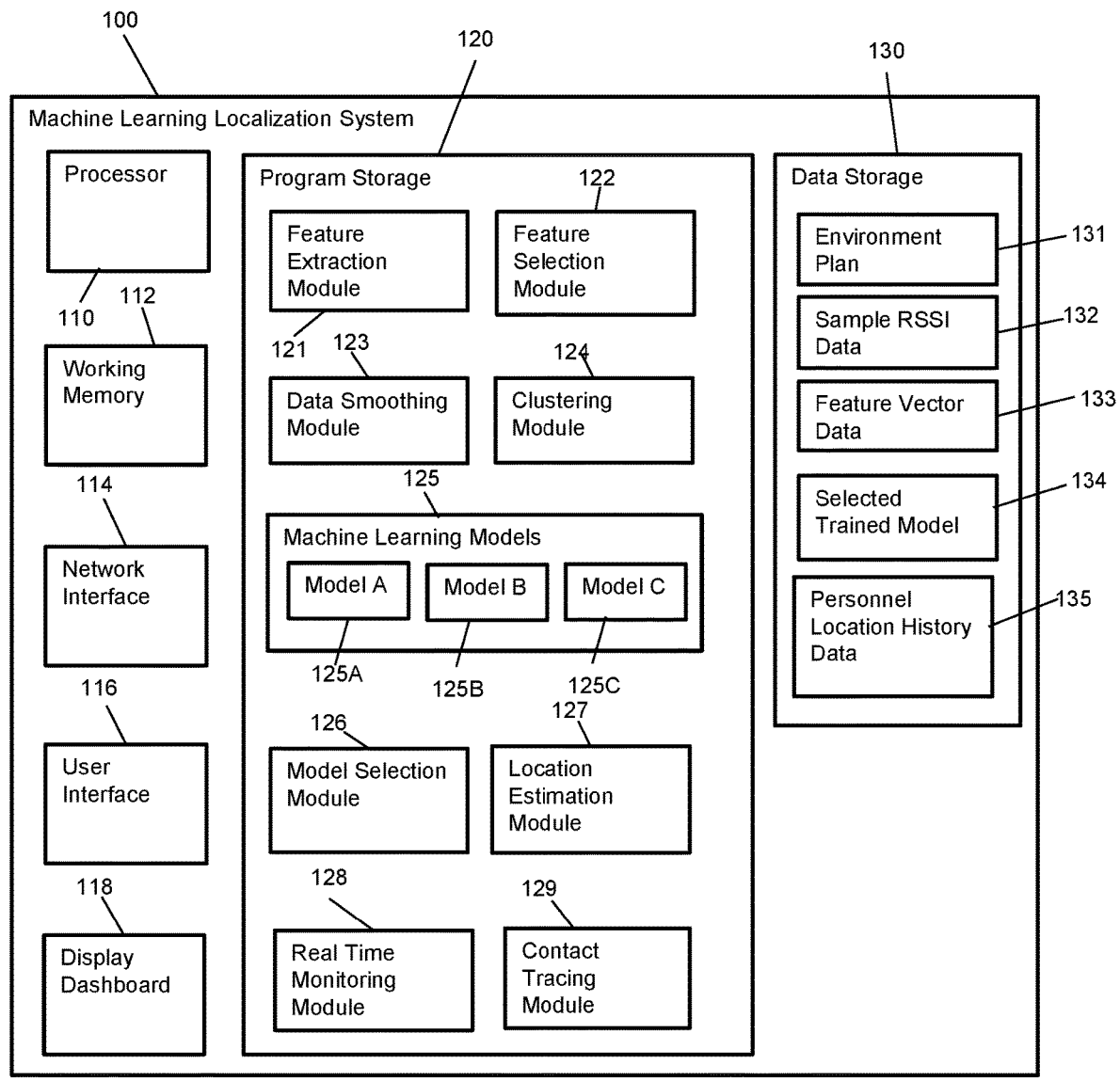
FIG. 3 is a block diagram showing a machine learning localization system according to an embodiment of the present invention.

FIG. 3 shows a machine learning localization system according to an embodiment of the present invention. The machine learning localization system 100 is a computer system with memory that stores computer program modules which implement localization methods according to embodiments of the present invention.

The machine learning localization system 100 comprises a processor 110, a working memory 112, a network interface 114, a user interface 116, a display dashboard 118, program storage 120 and data storage 130. The processor 110 may be implemented as one or more central processing unit (CPU) chips. The program storage 120 is a non-volatile storage device such as a hard disk drive which stores computer program modules. The computer program modules are loaded into the working memory 112 for execution by the processor 110. The network interface is an interface which allows data, for received signal strength indicator data sets to be received by the machine learning localization system 100. The network interface 114 may be a wireless network interface such as a Wi-Fi or Bluetooth interface, alternatively it may be a wired interface. The user interface 116 allows a user of the machine learning localization system 100 to input selections and commands and may be implemented as a graphical user interface. The display dashboard 118 generates a display dashboard showing the environment and the locations of personnel in the environment. In some embodiments, the display dashboard 118 may be configured to generate the display dashboard to be displayed on user device such as a tablet device connected to the machine learning localization system 100 via the network interface 114.

The program storage 120 stores a feature extraction module 121, a feature selection module 122, a data smoothing module 123, a clustering module 124, machine learning models 125 comprising three machine learning models: model A 125A, model B, 125B and model C 125C, a model selection module 126, a location estimation module 127, a real time monitoring module 128 and a contact tracing module 129. The computer program modules cause the processor 110 to execute various localization processing which is described in more detail below. The program storage 120 may be referred to in some contexts as computer readable storage media and/or non-transitory computer readable media. As depicted in FIG. 3, the computer program modules are distinct modules which perform respective functions implemented by the machine learning localization system 100. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the computer program modules is described herein, these may alternatively be implemented as one or more hardware modules (such as field-programmable gate array(s) or application-specific integrated circuit(s)) comprising circuitry which implements equivalent functionality to that implemented in software.

The data storage 130 stores an environment plan 131, sample received signal strength indicator (RSSI) data 132, feature vector data 133, a selected trained model 134 and personnel location history data 135. The environment plan 131 is a plan of the building or other environment in which personnel are to be tracked. The sample RSSI data 132 comprises data sets of RSSI data obtained at the discrete locations in the environment. The feature vector data 133 comprises a set of feature vectors which are derived from the sample RSSI data 132. The feature vector data 133 is used in the training process to train a machine learning model. The selected trained model 134 is a machine learning model which has been trained using the feature vector data 133. In some embodiments of the present invention, the machine learning localization system 100 is operable to train machine learning models of several different types—these are shown as model A 125A, model B 125B and model C 125C in FIG. 3. These machine learning models may be algorithms that are capable of producing probabilities such as ensemble algorithms (random forests, bagging, boosting algorithms like adaboost or xgboost, stacking algorithms, etc.). As will be explained in more detail below, multiple models may be trained using a training data set from the feature vector data 133, then a test data set from the feature vector data 133 is used to determine one of the models which has the best performance and this model is then saved as the selected trained model 134. The personnel location history data 135 comprises a plurality of entries for each personnel member indicting locations of the personnel member and time stamps.

Figure 4:
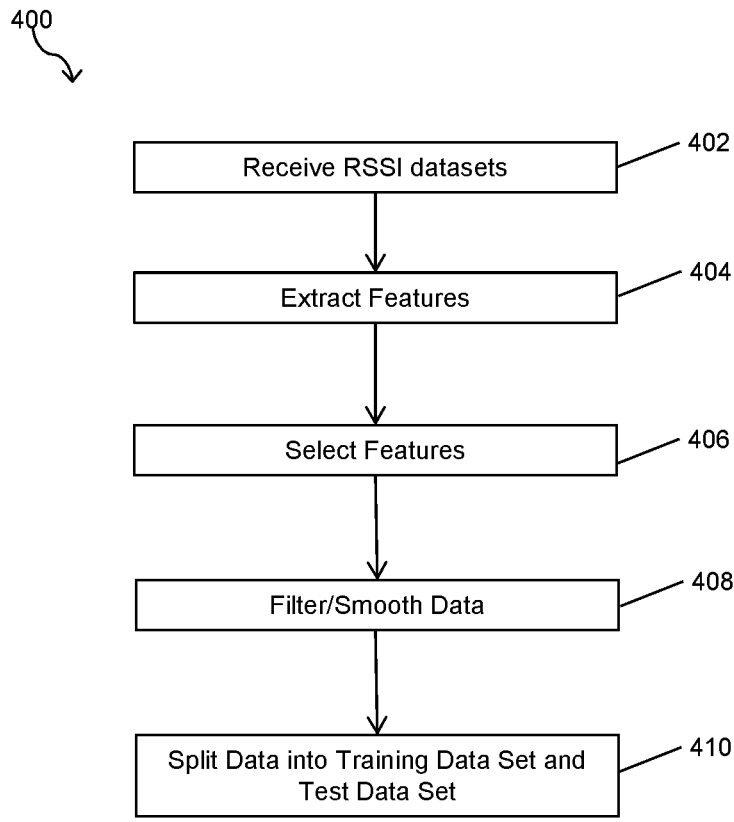
FIG. 4 is a flowchart showing a method of preprocessing received signal strength indicator data sets according to an embodiment of the present invention.

FIG. 4 is a flowchart showing a method of preprocessing received signal strength indicator data sets according to an embodiment of the present invention. The method 400 shown in FIG. 4 is carried out by the machine learning localization system 100 shown in FIG. 3.

In step 402, the machine learning localization system 100 receives RSSI data sets. The RSSI data sets are generated by moving a wireless device such as a mobile phone to each to the discrete locations and at each of the discrete locations capturing one or more data sets. Each data set comprises a set of RSSI values and the access point identifiers corresponding to each of the RSSI values. The access point identifiers may comprise media access control addresses (MAC addresses) for each of the access points or other identifiers.

Taking the scenario shown in FIG. 1 as an example, a sample data set is shown in Table 1 below:

TABLE 1

| Sample | Location | AP1-MAC1 | AP2-MAC2 | AP3-MAC3 | User mobile hotspot |
|---|---|---|---|---|---|
| 0 | Room1 |  | −90 | −50 | −54 |
| 1 | Room1 |  |  | −48 | −60 |
| 2 | Room1 |  | −92 | −52 | −65 |
| 3 | Room2 | −40 | −52 |  |  |
| 4 | Room2 | −43 | −52 |  |  |

As shown in Table 1, multiple samples are obtained for each discrete location. These samples may be obtained by, for example, holding the wireless device at different orientations. The multiple samples may also be obtained by visiting each of the discrete locations at multiple different times. The RSSI values shown in Table 1 are in units of decibel milliwatts (dBm). It is noted that not all of the access points are detected in each of the locations. In this example, the access point AP1 is not detected at the first discrete location 22 in Room 1 12. The access point AP3 and the mobile user hotspot 32 are not detected at the second discrete location 24 in Room 2 14.

The RSSI values are stored as sample RSSI data 132 in the data storage 130. A database storing the sample RSSI data 132 may store the data collected in the RSSI sniffing phase in an unstructured format, for example, JSON (JavaScript Object Notation) arrays. This is because each sample collected would consist of a location name and an array of detectable transmitters (wireless access points or beacons) along with their RSSI. So, the size of the RSSI array varies with location and sometimes even within samples of the same location.

In order to train a machine learning model a uniform array size among all samples is required, therefore the following step is carried out.

In step 404, the feature extraction module 121 is executed on the processor 110 of the machine learning localization system 100 to extract features from the sample RSSI data 132. This transforms the lists of RSSI-value mappings to uniform size vectors for all samples, i.e. it will append a value (such as zero) to all not-detected transmitters. Implementation example of such feature extractor/transformer is in sklearn.feature_extraction.DictVectorizer class of SciKit-learn library in Python. In addition, the feature extraction step may comprise deleting any duplicate samples. i.e. samples of the same location and has the exact RSSI values. Table 2 below shows an example of the vectors following feature extraction.

TABLE 2

| Sample | Location | AP1-MAC1 | AP2-MAC2 | AP3-MAC3 | User mobile hotspot |
|---|---|---|---|---|---|
| 0 | Room1 | 0 | −90 | −50 | −54 |
| 1 | Room1 | 0 | 0 | −48 | −60 |
| 2 | Room1 | 0 | −92 | −52 | −65 |
| 3 | Room2 | −40 | −52 | 0 | 0 |
| 4 | Room2 | −43 | −52 | 0 | 0 |

As shown in Table 2, zeros have been added for the non-detected transmitters.

In step 406, the feature selection module 122 is executed on the processor 110 of the machine learning localization system 100 to select features for use in the training of the machine learning model(s). Once the array of features is extracted, the next step is to remove features that are either irrelevant or looks intermittent. For example, using some regular expression or conditions from the user to filter out mobile or irrelevant transmitters such as mobile hot spots or temporary transmitters. Example of regular expression or condition is 'AP*' to keep only transmitters whose service set identifiers (SSIDs) contain the string 'AP'+ any other characters and any MAC address. Additionally, if in a certain location, 5 transmitters were detected with certain RSSI in 90% of the samples collected in that location but there is one transmitter that was detected only in 2% of the samples. These 2% intermittent detections may be removed by replacing that particular feature (transmitter) column with zeros. Table 3 shows an example of the vectors following feature selection.

TABLE 3

| Sample | Location | AP1-MAC1 | AP2-MAC2 | AP3-MAC3 |
|---|---|---|---|---|
| 0 | Room1 | 0 | −90 | −50 |
| 1 | Room1 | 0 | 0 | −48 |
| 2 | Room1 | 0 | −92 | −52 |
| 3 | Room2 | −40 | −52 | 0 |
| 4 | Room2 | −43 | −52 | 0 |

Table 3 shows the feature vectors after feature selection with ('AP*') regular expression applied on the feature identifiers.

In step 408, the data smoothing module 123 is executed on the processor 110 of the machine learning localization system 100 to smooth and filter the feature vectors. This is an optional step that would improve model training performance. This is dependent on user device, for example if RSSI values fluctuate a lot over samples in the same location, it is advantageous to apply the .filtering/smoothing. The filtering is done by for example applying a low-pass filter or a moving average filter for samples in each location. This will smooth any glitches or spurious jumps of RSSI in the same location. An example of this is shown in Table 4 below.

TABLE 4

| Location | Sample1 | Sample2 | Sample3 | Sample4 | Sample5 |
|---|---|---|---|---|---|
| Room1 | −40 | −42 | −60 | −41 | −42 |
| Room1 (filtered) | −40 | −41 | −47 | −43 | −44 |

Table 4 shows an example of smoothing using a moving average. It is noted that signal filtering will ignore the zeros since they represent transmitters not detected. Filtering is to smooth RSSI data collected (it is treated as time-series data for each location). Removing features (transmitters) happens in feature selection. If more than one set of data was collected at different time, if the data will be used for training the model they should be filtered/smoothed independently (if smoothing is required). Smoothing can also be applied during online tracking, this would be recommended if the update frequency is quite high, for example RSSI data is collected once a second.

The resultant feature vectors are stored in the data storage 130 of the machine learning localization system 100 as feature vector data 133.

In some embodiments, multiple machine learning models such as model A 125A, model B 125B and model C 125C are used and a performance evaluation is carried out using a test set of feature vector data. Thus in step 410, the feature vector data 133 is spilt into a test feature vector data set and a training feature vector data set.

Figure 5:
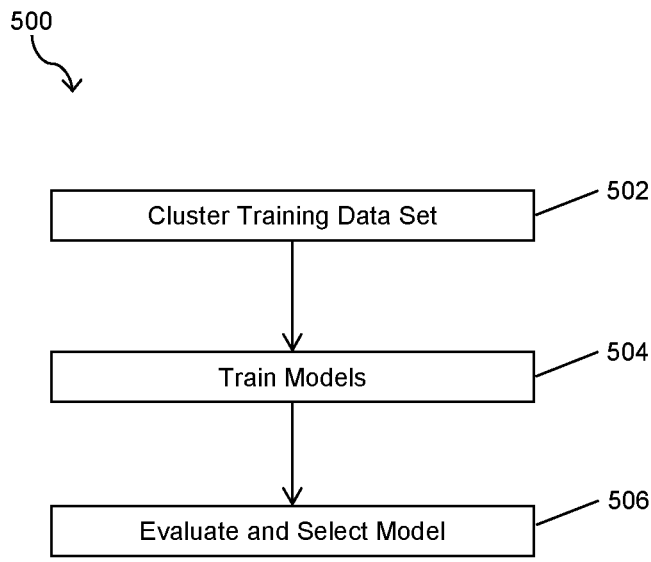
FIG. 5 is a flowchart showing a machine learning training method according to an embodiment of the present invention.

FIG. 5 is a flowchart showing a machine learning training method according to an embodiment of the present invention. The method 500 shown in FIG. 5 is carried out by the machine learning localization system 100 shown in FIG. 3.

In step 502, the clustering module 124 is executed on the processor 110 of the machine learning localization system 100 to cluster the feature vector data of the training feature vector data set. The clustering may be carried out using any clustering algorithm (such as K-Means Clustering), the feature array used for training (after preprocessing) will be the input and the output is a unique cluster number that identifies each group of features that are similar to each other. For example, a training data of 300 samples was clustered into 3 clusters, 150 samples in cluster 1, 100 samples in cluster 2 and 50 samples in cluster 3. The number of clusters can either be specified manually or automatically depending on the clustering algorithm selected. If K-means is used, the number of clusters may have to be manually specified. In such a case, the model selection section can find the best number of clusters. In the model selection, the number of clusters is varied from 2 to the number of locations by x increment specified by the user as a model selection parameter, then in step 506 the optimal number of clusters may be determined. The clustering step is particularly useful in complex or large environments. For example, separate models may be trained for different clusters.

In step 504, the machine learning model or models are trained using the training vector feature set. Many Machine learning algorithms can be used and the model selection will choose the best algorithm along with algorithm parameters suitable for each scenario. Since training the models is relatively fast and requires small processing power, we can do a brute-force search over all algorithms and their parameter space to find the best algorithm and best parameters for that algorithm and the best mode (clustering+classification or classification only). Algorithms that are capable of producing probabilities such as ensemble algorithms (random forests, bagging, boosting algorithms like adaboost or xgboost, stacking algorithms, etc.) may be used.

In step 506, the model selection module 126 is executed on the processor 110 of the machine learning localization system 100 to evaluate the different machine learning models and select the one having the best performance. The evaluation is based on the test feature vector data which may, for example be collected at different time interval to the training feature vector data. A single dataset can also be used by randomly dividing the samples into training and test subsets.

Figure 6:
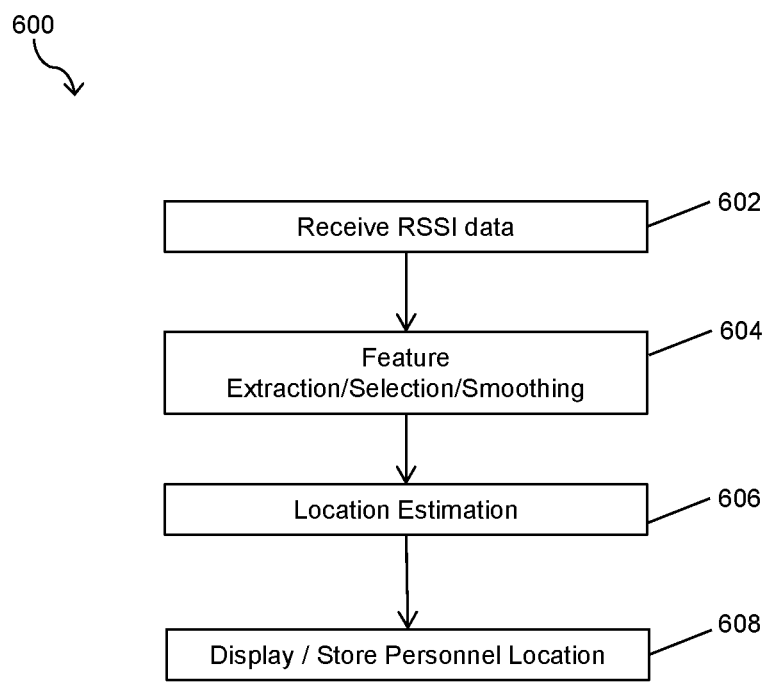
FIG. 6 is a flowchart showing a method of personnel localization according to an embodiment of the present invention.

FIG. 6 is a flowchart showing a method of personnel localization according to an embodiment of the present invention. The method 600 shown in FIG. 6 is carried out by the machine learning localization system 100 shown in FIG. 3.

In step 602, the machine learning localization system 100 receives RSSI data from the user device corresponding to the personnel member whose location is being estimated.

In step 604, the feature extraction module 121 and/or the feature selection module 122 and/or data smoothing module 123 are executed on the processor 110 of the machine learning localization system 100 to generate a feature vector for the received RSSI data in the format of the selected trained machine learning model 134. it is optional to use signal filtering or smoothing during tracking phase. This depends on RSSI fluctuation levels and update rate. The higher either, the more recommended filtering is. Here, filtering is the same as training phase. A low-pass or moving window filter is applied to smooth the time-series RSSI values. Feature extraction and selection follows the same as training phase. An Additional step to algin the feature shape and sequence of columns to be the same as the training phase may be carried out. For example, a new transmitter that was installed recently will be removed from feature array since it was not included in the training phase. The sklearn.feature_extraction.DictVectorizer class implementation from SciKit-learn package would handle this, in training we use DictVectorizer.fit and save the output with the model and in tracking phase we just call DictVectorizer.transform on the new RSSI data to extract the features before feeding to the model.

In step 606, the location estimation module 127 is executed on the processor 110 of the machine learning localization system 100 to estimate the location of the personnel member. The location of the personnel member is estimated by the selected trained model as the discrete location which has the highest probability of corresponding to the feature vector obtained from the received RSSI data. If clustering+classification mode was used, then the clustering algorithm will receive the RSSI values and predict cluster numbers and append the values to the features and pass to classification which will then predict locations. The clustering algorithms work like classification where there is a training phase to find the patterns among features and assign the same cluster id to the samples that exhibit the same pattern and a prediction phase—given input features, it predicts which cluster it belongs to.

In step 608, the real time monitoring module 128 is executed on the processor 110 of the machine learning localization system 100 to display the estimated location of the personnel member on the display dashboard 118, and/or estimated location of the personnel member is stored with a time stamp in the personnel location history data 135.

The contact tracing module 129 may be executed to identify contacts of a personnel member using the personnel location history data 135 stored in the data storage 130 of the machine learning localization system 100.

Whilst the foregoing description has described exemplary embodiments, it will be understood by those skilled in the art that many variations of the embodiments can be made within the scope and spirit of the present invention.

The invention claimed is:

1. A machine learning method for estimating a location of a target wireless device in an indoor environment comprising multiple rooms, the method comprising:
   receiving a plurality of training received signal indictor data sets for discrete locations within each of the multiple rooms of the indoor environment, each training received signal indicator data set comprising first received signal indicator values and first corresponding wireless transmitter identifiers for wireless signals received by a test wireless device at a respective discrete location, from wireless access points within the indoor environment;
   generating feature vectors from the training received signal indicator data sets;
   training a machine learning model using the feature vectors to obtain a trained machine learning model;
   receiving a target received signal data set from the target wireless device, the target received signal data set comprising second received signal indicator values and second corresponding wireless transmitter identifiers for wireless signals received by the target wireless device from one or more of the wireless access points within the indoor environment;
   generating a target feature vector from the target received signal data set; and
   estimating a location of the target wireless device, within one of the multiple rooms, as a discrete location output by the trained machine learning model in response to the target feature vector.

2. A method according to claim 1, further comprising clustering the feature vectors into a plurality of clusters.

3. A method according to claim 2, further comprising training another machine learning model for each cluster of feature vectors and wherein estimating a location of the target wireless device comprises identifying a target cluster of the plurality of clusters for the target feature vector and estimating the location of the target wireless device as the discrete location output by the trained machine learning model corresponding to the target cluster in response to the target feature vector.

4. A method according to claim 1, further comprising training a plurality of machine learning models using the feature vectors to obtain a plurality of trained machine learning models and selecting one of the trained machine learning models as the machine learning model for estimating the location of the target wireless device.

5. A method according to claim 4, further comprising dividing the feature vectors into a training feature vector set and a test feature vector set, wherein training the plurality of machine learning models comprises training the plurality of machine learning models with the training feature vector set and selecting one of the trained machine learning models comprises calculating an evaluation metric using the test feature vector set and selecting one of the plurality of machine learning models based on the evaluation metric.

6. A method according to claim 1, wherein the machine learning model is an ensemble algorithm.

7. A method according to claim 1, wherein generating feature vectors from the training received signal indicator data sets comprises transforming the training received signal indicator data sets into uniform size vectors by appending a value for one or more of the first corresponding wireless transmitter identifiers for which no signal was detected.

8. A method according to claim 1, wherein generating feature vectors from the training received signal indicator data sets comprises filtering the training received signal indicator data sets based on the first corresponding wireless transmitter identifiers.

9. A method according to claim 1, wherein generating feature vectors from the training received signal indicator data sets comprises applying a filter to datasets corresponding to common wireless transmitter identifiers.

10. A method according to claim 1, further comprising displaying an indication of the location of the target wireless device on a plan of the indoor environment.

11. A contact tracing method comprising performing a method according to claim 1 for multiple wireless devices corresponding to different personnel members at a plurality of different times and identifying contacts of a target personnel member based on the different times and estimated locations of the different personnel members.

12. A non-transitory computer readable medium storing processor executable instructions that, when executed on one or more processors, cause the one or more processors to carry out a method according to claim 1.

13. A machine learning system for estimating a location of a target wireless device in an indoor environment comprising multiple rooms, the machine learning system comprising one or more processors and a data storage device storing computer program instructions operable to cause the one or more processors to:
receive a plurality of training received signal indictor data sets for discrete locations within each of the multiple rooms of the indoor environment, each training received signal indicator data set comprising first received signal indicator values and first corresponding wireless transmitter identifiers for wireless signals received by a test wireless device at a respective discrete location, from wireless access points within the indoor environment;
generate feature vectors from the training received signal indicator data sets;
train a machine learning model using the feature vectors to obtain a trained machine learning model;
receive a target received signal data set from the target wireless device, the target received signal data set comprising second received signal indicator values and second corresponding wireless transmitter identifiers for wireless signals received by the target wireless device from one or more of the wireless access points within the indoor environment;
generate a target feature vector from the target received signal data set; and
estimate a location of the target wireless device, within one of the multiple rooms, as a discrete location output by the trained machine learning model in response to the target feature vector.

14. A machine learning system according to claim 13, wherein the data storage device further stores computer program instructions operable to cause the one or more processors to cluster the feature vectors into a plurality of clusters.

15. A machine learning system according to claim 14, wherein the data storage device further stores computer program instructions operable to cause the one or more processors to train another machine learning model for each cluster of feature vectors and to estimate a location of the target wireless device by identifying a target cluster of the plurality of clusters for the target feature vector and estimating the location of the target wireless device as the discrete location output by the trained machine learning model corresponding to the target cluster in response to the target feature vector.

16. A machine learning system according to claim 13, wherein the data storage device further stores computer program instructions operable to cause the one or more processors to train a plurality of machine learning models using the feature vectors to obtain a plurality of trained machine learning models and select one of the trained machine learning models as the machine learning model for estimating the location of the target wireless device.

17. A machine learning system according to claim 13, wherein the data storage device further stores computer program instructions operable to cause the one or more processors to generate feature vectors from the training received signal indicator data sets by transforming the training received signal indicator data sets into uniform size vectors by appending a value for one or more of the first corresponding wireless transmitter identifiers for which no signal was detected.

18. A machine learning system according to claim 13, wherein the data storage device further stores computer program instructions operable to cause the one or more processors to generate feature vectors from the training received signal indicator data sets by transforming the training received signal indicator data sets into uniform size vectors by filtering the training received signal indicator data sets based on the first corresponding wireless transmitter identifiers.

19. A machine learning system according to claim 13, wherein the data storage device further stores computer program instructions operable to cause the one or more processors to display an indication of the location of the target wireless device on a plan of the indoor environment.

20. A machine learning system according to claim 13, wherein the data storage device further stores computer program instructions operable to cause the one or more processors to estimate a position of multiple wireless devices corresponding to different personnel members at a plurality of different times and identify contacts of a target personnel member based on the different times and estimated locations of the different personnel members.

\* \* \* \* \*